Patented July 31, 1945

2,380,405

UNITED STATES PATENT OFFICE 2,380,405

POLYMERIZATION OF CONJUGATED DIENE HYDROCARBONS

George L. Browning, Jr., William D. Stewart, and Benjamin M. G. Zwicker, Akron, Ohio, assignors, by mesne assignments, to The B. F. Goodrich Company, Akron, Ohio, a corporation of New York No Drawing. Application May 31, 1941,
Serial No. 396,158

10 Claims. (Cl. 260—84.5)

This invention relates to the polymerization of butadiene hydrocarbons, and particularly to a method whereby butadiene hydrocarbons may be polymerized in an aqueous emulsion to form products closely resembling natural crude rubber.

It is disclosed in the copending application of Charles F. Fryling, Serial No. 396,155, filed May 31, 1941, that compounds containing a 2-thiothiazyl group modify the emulsion polymerization of butadiene hydrocarbons in such a manner that polymers more nearly resembling natural rubber are produced. We have discovered that although polymers exhibiting desirable properties are produced in the presence of compounds containing a 2-thiothiazyl group, the polymerizations are ordinarily somewhat slower when a 2-thiothiazyl compound is included in the recipe.

We have found that if a small amount, ordinarily less than .1% based on the monomers, of a simple ionizable cobalt salt is included in the emulsion during the polymerization, the inhibiting effect of the modifiers is counteracted and the activity of the modifiers is increased.

Any modifier containing the 2-thiothiazyl group which may be represented by the following structural formula:

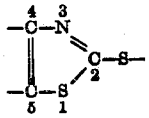

may be employed. Preferred modifiers include the aliphatic 2-mercapto-thiazoles, by which is meant compounds in which the carbon atoms numbered 4 and 5 do not form part of an unsaturated carbocyclic ring, such as 2-mercapto-4-ethylthiazole, 2-mercapto-4-phenylthiazole, 2-mercapto-4,5-dimethylthiazole, 2 - mercapto - 4 - methoxymethylthiazole, and the corresponding bis-thiazyl-2 mono-, di-, and polysulfides, the aliphatic bis-thiazyl-2 disulfides producing especially good results. Other compounds which may be employed, but which do not in general possess as great activity as the aliphatic 2-mercaptothiazoles include the aromatic thiazoles, by which is meant compounds in which the carbon atoms numbered 4 and 5 form part of an unsaturated carbocyclic ring, such as 2-mercaptobenzothiazole, 2-mercaptonaphthothiazole, and the corresponding aromatic bis-thiazyl-2 mono-, di-, and polysulfides. 2-thiazyl sulfides such as 4,5-dimethylthiazyl-2 diethylamino sulfide, benzothiazyl-2 dicyclohexylamino sulfide, and other compounds containing the 2-thiazyl group may also be employed. The compounds in which the basicity is increased by the presence of nitrogenous substituents, for instance, exhibit activity as modifiers, but they also retard the polymerization. The use of appropriate amounts of the cobalt salts herein described counteracts this effect and allows the polymerizations to be conducted in reasonable lengths of time.

The proportion in which the 2-thiothiazyl compound is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or over may advantageously be employed.

By the term "simple ionizable cobalt salt" is meant the simple inorganic or organic cobalt salts which yield ions in aqueous solution. The salt need not be completely or even moderately soluble in water in order to be employed since even relatively insoluble salts are known to ionize to a limited extent. The term "simple ionizable salt" distinguishes from complex compounds in which the cobalt is united to other elements in the compound by coordinated covalences and is meant to include only those compounds in which the metal exerts its primary positive valences.

Among the simple ionizable cobalt salts which may be employed may be mentioned the chlorides, bromides, nitrates, sulfates, carbonates, borates, acetates, sulfites, thiosulfates, cyanides, and sulfides, the water-soluble salts including the halides, sulfates, and nitrates being preferred. Cobaltous or cobaltic salts, or a mixture of the oxidized and reduced forms may be used. It is generally desirable to employ the cobalt salt in amounts not greater than .1% based on the monomers, although this is not a critical value, and amounts as great as 1% and more may be used in some instances, some systems exhibiting a greater tolerance towards excess cobalt salt than others. The use of too great amounts of cobalt salt will increase the time required for the polymerization to reach completion.

As a specific example of the use of the cobalt salts, a mixture of 55 parts by weight of butadiene and 45 parts of acrylonitrile was copolymerized at 30° C. in the presence of about 250 parts of a 3% aqueous solution of myristic acid which had been 85% neutralized with sodium hydroxide, 0.35 part of hydrogen peroxide as an initiator, 0.05 part of cobaltous chloride, and 0.5 part of 2-mercaptobenzothiazole. The polymerization required 19 hours and the polymer obtained by coagulating the latex-like product of the polymerization attained a maximum tensile strength of 4900 lbs./in.$^2$ and a maximum ultimate elongation of 440% when tested in a tire tread recipe. When the experiment was repeated with omission of the cobaltous chloride, the polymerization required 28 hours, and the polymer attained a maximum tensile strength of only 3800 lbs./in.$^2$ and an elongation of only 300%, while repetition of the experiment with the omission of the 2-mercaptobenzothiazole required 19 hours, and yielded a polymer exhibiting a maximum tensile strength of 3950 lbs./in.$^2$ and an elongation of 280% when tested in the same tread recipe. It can be seen that the combination of a 2-thiothiazyl compound and a cobalt salt produced a polymer superior to those obtained in the absence of either the 2-thiothiazyl compound or the cobalt salt.

In another series of tests, 75 parts of butadiene and 25 parts of acrylonitrile were copolymerized at 30° C. in the presence of about 250 parts of a 3% aqueous myristic acid solution which had been 85% neutralized with sodium hydroxide, 0.35 part of hydrogen peroxide as an initiator, 1.2 parts of sodium sulfate to prevent gel formation, 0.05 part of cobaltous chloride, and varying amounts of different modifiers. The latex-like products were coagulated and washed, and the resulting products were tested for solubility in benzene, and were vulcanized in a tire tread recipe. The following results were obtained:

| Modifier | Amount, parts by weight | Solubility in benzene, percent | Tensile strength in lbs./in.$^2$ | Elong. |
|---|---|---|---|---|
| 2-mercapto-4-ethylthiazole | 0.49 | 17.5 | 4,550 | 600 |
| Di-2-(4 ethyl) thiazyl disulfide | .40 | 34.0 | 3,600 | 680 |
| 2-mercapto-4,5-dimethylthiazole | .49 | 18.5 | 4,650 | 580 |
| Di-2-(4-5,dimethyl) thiazyl disulfide | .49 | 42.0 | 3,900 | 620 |
| 2-mercapto-4-methyl-5-carbethoxythiazole | .68 | 14.5 | 3,900 | 500 |
| 2-mercapto-4-phenyl thiazole | .65 | 20.0 | 4,200 | 570 |
| Di-2-(4-phenyl) thiazyl disulfide | .65 | 31.0 | 3,750 | 620 |
| 2-mercaptobenzothiazole | .56 | 12.0 | 4,200 | 420 |
| 2-mercapto-6-nitrobenzothiazole | .71 | 12.0 | 5,650 | 720 |

The presence of the cobalt in the above polymerization not only shortened the time necessary for the experiment to reach completion, but the products had a greater resemblance to natural rubber in respect to solubility of the crude material than those prepared in the absence of either the cobalt or the 2-thiothiazyl compound.

The modifying agents of this invention may be employed in the polymerization in aqueous emulsion of butadiene hydrocarbons such as butadiene, 2,3-dimethylbutadiene, isoprene, or piperylene either alone or in admixture with each other or with other monomers copolymerizable therewith. As examples of monomers copolymerizable with butadiene hydrocarbons may be mentioned such compounds as styrene, vinyl naphthalene, acrylonitrile, methacrylonitrile, methyl methacrylate, vinyl acetate, vinylidene chloride, methyl vinyl ketone, methyl vinyl ether, and similar unsaturated hydrocarbons, nitriles, esters, ketones, and ethers. These monomers are preferably employed in smaller amounts than the butadiene hydrocarbons.

The polymerization of the above materials in aqueous emulsion may be effected by various initiators of polymerization such as per-compounds including per-acids, peroxides, and per-salts such as persulfates, perborates, percarbonates, and the like, as well as other types of initiators such as diazoaminobenzene, and dipotassium diazomethane disulfonate.

Any of the ordinary emulsifying agents such as fatty acid soaps including sodium oleate and sodium stearate, hymolal sulfates and aryl sulfonates including sodium lauryl sulfate and sodium isopropyl naphthalene sulfonate, and salts of organic bases containing long carbon chains such as the hydrochloride of diethylaminoethyloleylamide, trimethylcetylammonium methyl sulfate, etc., may be employed in the polymerization.

The terms "butadiene hydrocarbons" and "a butadiene hydrocarbon" signify butadiene-1,3 and its homologues which enter into polymerization reactions in substantially the same manner. The term "sulfide" is a generic term including the mono-, di-, and polysulfides.

Although we have herein disclosed specific embodiments of our invention, we do not intend to limit the invention solely thereto, for it will be obvious to those skilled in the art that many variations and modifications are within the spirit and scope of the invention as defined in the appended claims.

We claim:

1. The method which comprises polymerizing a conjugated butadiene hydrocarbon in the form of an aqueous emulsion in the presence of a compound containing the 2-thiothiazyl group and a simple ionizable cobalt salt.

2. The method which comprises polymerizing a conjugated butadiene hydrocarbon in the form of an aqueous emulsion in the presence of a 2-mercaptothiazole and a water-soluble cobalt salt.

3. The method which comprises copolymerizing in the form of an aqueous emulsion butadiene and a smaller amount of a monomer copolymerizable therewith in aqueous emulsion in the presence of a 2-mercaptothiazole and less than 0.1% based on the materials polymerized of a water-soluble cobalt salt.

4. The method which comprises copolymerizing butadiene and acrylonitrile in the form of an aqueous emulsion in the presence of an aliphatic 2-mercaptothiazole and less than 0.1% based on the materials polymerized of a water-soluble cobalt salt.

5. The method of claim 4 in which the thiazole is 2-mercapto-4-ethylthiazole.

6. The method of claim 4 in which the thiazole is 2-mercapto-4,5-dimethylthiazole.

7. The method which comprises polymerizing a conjugated butadiene hydrocarbon in the form of an aqueous emulsion in the presence of a bis-thiazyl-2 sulfide, and less than 0.1% based on the materials polymerized of a water-soluble cobalt salt.

8. The method which comprises copolymerizing butadiene and acrylonitrile in the form of an aqueous emulsion in the presence of an aliphatic bis-thiazyl-2 disulfide and less than 0.1% based on the materials polymerized of a water-soluble cobalt salt.

9. The method of claim 8 in which the bis-thiazyl-2 disulfide is bis-4,5-dimethylthiazyl-2 disulfide.

10. The method which comprises polymerizing a conjugated butadiene hydrocarbon in the form of an aqueous emulsion in the presence of a compound containing the 2-thiothiazyl group and less than 0.1% based on the material polymerized of cobaltous chloride.

GEORGE L. BROWNING, Jr.
WILLIAM D. STEWART.
BENJAMIN M. G. ZWICKER.